(12) United States Patent
Kim et al.

(10) Patent No.: US 11,820,860 B2
(45) Date of Patent: Nov. 21, 2023

(54) LIQUID CRYSTAL POLYESTER COMPOSITION OF LOW DIELECTRIC CONSTANT AND LOW DIELECTRIC LOSS RATE WITH IMPROVED FLUIDITY

(71) Applicant: SEYANG POLYMER, Incheon (KR)

(72) Inventors: Hyuk Jin Kim, Jincheon-gun (KR); Tae-Young Ha, Incheon (KR); Sun Hwa Jang, Yongin-si (KR); Youn Eung Lee, Daejeon (KR); Jin Kyu Lee, Hwaseong-si (KR)

(73) Assignee: SEYANG POLYMER, Incheon (KR)

( * ) Notice: Subject to any disclaimer, the term of this patent is extended or adjusted under 35 U.S.C. 154(b) by 244 days.

(21) Appl. No.: 17/367,699

(22) Filed: Jul. 6, 2021

(65) Prior Publication Data
US 2022/0204689 A1    Jun. 30, 2022

(30) Foreign Application Priority Data

Dec. 29, 2020  (KR) .......................... 10-2020-0185552

(51) Int. Cl.
| | |
|---|---|
| *C08G 63/60* | (2006.01) |
| *C08G 63/81* | (2006.01) |
| *C08K 7/28* | (2006.01) |
| *C08K 3/40* | (2006.01) |
| *C08K 3/34* | (2006.01) |
| *C08K 13/04* | (2006.01) |

(52) U.S. Cl.
CPC ............ *C08G 63/605* (2013.01); *C08G 63/81* (2013.01); *C08K 3/34* (2013.01); *C08K 3/40* (2013.01); *C08K 7/28* (2013.01); *C08K 13/04* (2013.01); *C08G 2250/00* (2013.01); *C08K 2003/343* (2013.01); *C08K 2201/014* (2013.01)

(58) Field of Classification Search
CPC .......... C08G 63/60; C08G 63/81; C08K 7/28; C08K 3/40; C08K 3/34; C08K 13/04
USPC .......................................................... 523/219
See application file for complete search history.

(56) References Cited

U.S. PATENT DOCUMENTS

| | | | | |
|---|---|---|---|---|
| 5,995,361 | A | * | 11/1999 | Jayaraj ...................... H01G 4/18 428/416 |
| 7,737,198 | B2 | | 6/2010 | Murouchi et al. |
| 2002/0190239 | A1 | * | 12/2002 | Kitayama ............ C08G 63/065 252/299.01 |

FOREIGN PATENT DOCUMENTS

| | | |
|---|---|---|
| KR | 10-2019009 B1 | 8/2019 |
| WO | WO-2019151184 A1 * | 8/2019 ............... C08K 3/36 |

* cited by examiner

*Primary Examiner* — Deve V Hall
(74) *Attorney, Agent, or Firm* — GOLDILOCKS ZONE IP LAW

(57) ABSTRACT

The present disclosure relates to a liquid crystal polyester resin composition comprising a liquid crystal polyester resin with a low dielectric constant and a low dielectric loss containing a naphthoic acid monomer as a main skeleton and a hydroxybenzoic acid; a glass bubble having a pressure resistance of 12,000 psi or more; and an inorganic filler such as mica. The present disclosure provides a liquid crystal polyester resin composition suitable for 5G communication materials, which can achieve low dielectric loss characteristics, and at the same time, the addition of glass bubbles with excellent pressure resistance can achieve a low dielectric constant and a low dielectric loss through the maintenance of the hollow body of the glass bubbles even after melt extrusion.

6 Claims, 2 Drawing Sheets

[FIG. 1]
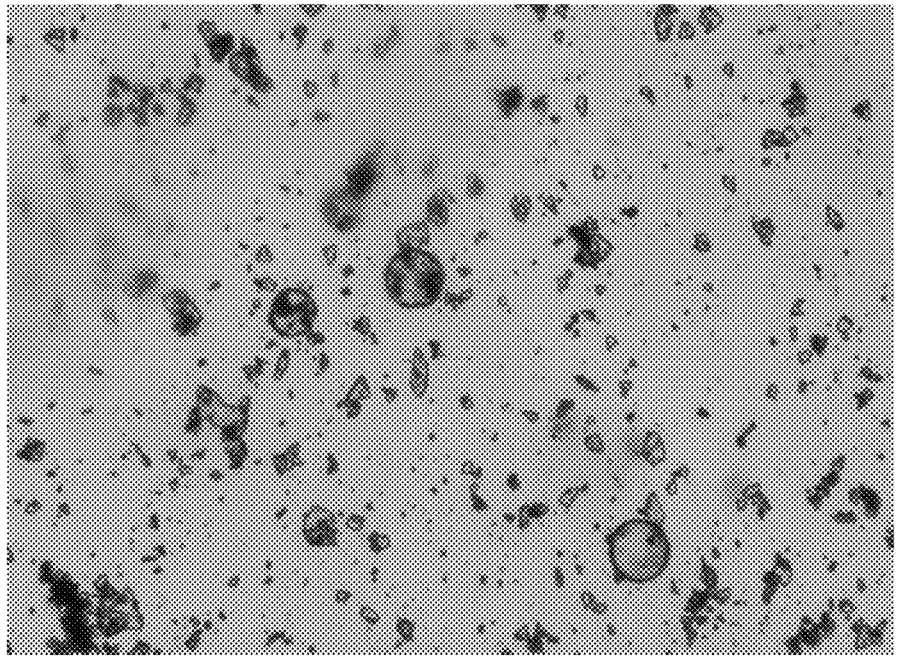

[FIG. 2]
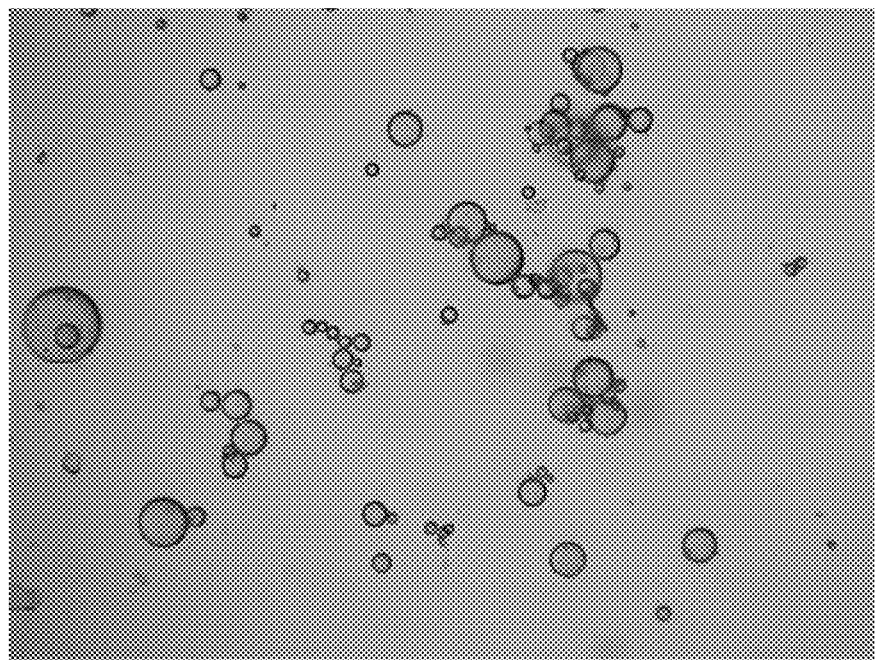

LIQUID CRYSTAL POLYESTER COMPOSITION OF LOW DIELECTRIC CONSTANT AND LOW DIELECTRIC LOSS RATE WITH IMPROVED FLUIDITY

CROSS REFERENCE TO RELATED PATENT APPLICATION

This application is based on and claims priority under 35 U.S.C. §119 from Korean Patent Application No. 10-2020-0185552, filed on Dec. 29, 2020, in the Korean Intelectual Property Office, the disclosure of which is incorporated by reference herein in its entirety.

BACKGROUND

Field of the Invention

In the transition period to the advanced information age in which IoT era is approaching, a technology is required for transmitting very high-capacity data at high speed.

Smartphones and tablet PCs, which are playing a key role in information and communication devices, are further improving in the direction of miniaturization, weight reduction, and multi-functionality. In addition, the application of high-speed transmission components to quickly acquire and control sensor and camera information obtained during driving through an expanded conversion of automobiles to EV and automatic driving technology is expected to increase in the future in the automotive field as well.

Further, high-frequency broadband shifting of a transmission signal is in progress due to an increase in the amount of transmission information, and accordingly, a demand is increasing for high-performance and highly reliable electronic components that can adapt to high-frequency regions such as microwaves and milliwaves.

A liquid crystal polyester resin is a material having high heat resistance, and a low dielectric constant and dielectric loss. With the development of such innovative information and communication technology, the liquid crystal polyester resin is attracting attention as a component material for information and communication devices. In particular, in order to be used as a material for 5G communication, the dielectric constant and dielectric loss should be low in the high-frequency region, and a liquid crystal polyester resin composition that satisfies these required characteristics has possibility and potential to be used for various applications.

Description of the Related Art

High-frequency broadband shifting of a transmission signal is in progress due to an increase in the amount of transmission information, and accordingly, a demand is increasing for high-performance and highly reliable electronic components that can be used in high-frequency regions such as microwaves and milliwaves.

Meanwhile, for 5G communication, the transmission loss of electric signals is greatly affected by a dielectric constant and dielectric loss of components and materials used in the communication devices. That is, the frequency of the 5G band uses an ultra-high frequency range, and the dielectric constant and the dielectric loss for most materials increase proportionally as the frequency of the electrical signal increases. As such, high dielectric constant and dielectric loss of communication equipment materials are not suitable because they attenuate an electric signal and impair the reliability of the electric signal, such that for materials handling high-frequency signals, research is required to suppress or reduce increases in the dielectric constant and dielectric loss in the high-frequency region.

In general, hollows in a product plays a role in lowering the dielectric constant and dielectric loss. That is, in order to achieve a low dielectric constant and a low dielectric loss, it is necessary to increase the amount of hollows in the product, and for this purpose, a method of adding a hollow body such as a glass bubble is known.

On the other hand, since a liquid crystal polyester resin has low dielectric properties by itself, it has a great potential to be applied to materials for 5G communication, but has not yet reached the stage of securing satisfactory physical properties.

Although the liquid crystal polyester resin has low dielectric properties by itself, there is a problem that it needs to secure lower dielectric properties in order to be applied as a material for 5G communication, and to solve this problem, hollow glass bubbles are used as a filler. In particular, the filler is added through a melt extrusion process. In this process, a low dielectric constant and a low dielectric loss can be realized only if the hollow shape of the glass bubbles is not damaged. If glass bubbles with low internal pressure characteristics are used, the shape of the hollow body is damaged by a strong shear stress generated between the screw and the barrel inside the extruder during melt extrusion, making it difficult to secure low dielectric properties.

Further, change in fluidity according to the particle size of the glass bubbles and increase in viscosity due to content increase cause decrease in fluidity, and there is a disadvantage in that productivity is lowered by acting as a negative factor during injection molding.

In order to overcome this disadvantage, in the present disclosure, lower dielectric properties can be implemented through a resin containing a naphthoic acid (HNA), and the use of the glass bubbles with high-pressure resistance allows the hollow shape of the glass bubbles to be preserved even after melt extrusion, thereby achieving low dielectric properties and securing the fluidity, such that the injection moldability can be improved and the productivity can also be increased.

BRIEF SUMMARY OF THE INVENTION

The present disclosure aims to provide a liquid crystal polyester resin composition that satisfies low dielectric properties in response to a high frequency signal.

The present disclosure further aims to provide a liquid crystal polyester resin composition having excellent fluidity in order to secure moldability and productivity in molding components of a high-frequency communication device.

The present disclosure provides a liquid crystal polyester resin composition having a low dielectric constant and a low dielectric loss characteristic, which may include a liquid crystal polyester resin including a naphthoic acid monomer as a main skeleton and a hydroxybenzoic acid, an inorganic filler, and a glass bubble having a pressure resistance of 12,000 psi or more. When the pressure resistance of the glass bubble is maintained above 12,000 psi, mechanical loss due to strong shear stress generated between the screw and the barrel inside the extruder may be endured, such that an LCP composition having low dielectric properties and low dielectric loss can be prepared.

According to an embodiment of the present disclosure, the liquid crystal polyester resin composition may have a naphthoic acid content of 40 to 55 moles based on 100 moles of the total monomer of the liquid crystal polyester resin. If the naphthoic acid content is maintained between 40 to 55 moles, the number of functional groups distributed within the same molecular weight decreases, and an appropriate hollow can be formed inside to achieve a low dielectric constant and a low dielectric loss. If the naphthoic acid content is less than 40 moles based on the total 100 moles of the liquid crystal polyester resin monomer, the number of functional groups distributed within the same molecular weight increases, and a hollow is not sufficiently formed inside, so it is difficult to lower the dielectric constant and dielectric loss. If it exceeds 55 moles, crystallinity is increased and elongation is lowered, which are not preferable.

According to an embodiment of the present disclosure, the inorganic filler may be at least one selected from the group consisting of glass bubbles, silica, titanium oxide, talc, and calcium carbonate.

According to an embodiment of the present disclosure, the particle size of the glass bubble is preferably in the range of 40 to 500 μm. If the particle size of the glass bubble is less than 40 μm, the surface area increases at the same content to increase the resistance to the flow of the liquid crystal polyester resin, so it is not preferable because the fluidity are lowered. If it exceeds 500 μm, the pressure resistance characteristic is difficult to secure and the dielectric properties are increased because the hollow state cannot be maintained during melt extrusion, which is not desirable.

According to an embodiment of the present disclosure, the total content of the inorganic filler and the glass bubbles may be 15 to 55 wt %, the glass bubbles may be 10 to 30 wt % based on the total weight of the composition, and the inorganic filler may be 5 to 25 wt %.

If the total content of the inorganic filler and glass bubbles is less than 15 wt %, the mechanical strength of the liquid crystal polyester resin composition is low, which is not preferable. If the total content exceeds 55 wt %, it is difficult to quantitatively input during the melt extrusion process, and the fluidity of the liquid crystal polyester resin are significantly lowered, which is also not desirable.

According to an embodiment of the present disclosure, the dielectric constant (Dk) of the liquid crystal polyester resin composition may be less than 3.0.

According to an embodiment of the present disclosure, the dielectric loss (Df) of the liquid crystal polyester resin composition may be less than 0.004.

In materials handling high-frequency signals or high-speed digital signals, the most important characteristics are low transmission loss and short propagation delay time. A factor that hinders these characteristics is however a signal attenuation and hence the increase in error.

For this reason, the dielectric constant (Dk) should be less than 3.0 and the dielectric loss (Df) should be less than 0.004 to reduce the transmission loss and reduce the delay time. If the dielectric constant (Dk) is 3.0 or more or the dielectric loss (Df) is 0.004 or more, problems such as heat generation of the device, signal attenuation, and propagation delay may occur.

According to the present disclosure, it is intended to achieve a low dielectric constant and a low dielectric loss by using a liquid crystal polyester resin having low dielectric properties of the resin itself, and by melt extrusion so that the shape of hollow bodies of glass bubbles having excellent pressure resistance is completely maintained.

In performing a melt extrusion process of the liquid crystal polyester resin composition, by use of glass bubbles having a strength of 12,000 psi or more, the hollow bodies can be maintained even after melt extrusion, such that a low dielectric constant and a low dielectric loss can be realized even if their small amount is added. Therefore, if a small amount of glass bubbles having a density in the range of 0.5 to 0.7 g/cc is added, fluidity can be secured during a melt extrusion process and an injection molding process.

BRIEF DESCRIPTION OF THE DRAWINGS

FIG. 1 shows a photograph taken with a microscope of the remaining inorganic additives after sintering the liquid crystal polyester composition of the present disclosure.

FIG. 2 shows a photograph taken with a microscope of the remaining inorganic additives after sintering the liquid crystal polyester resin composition of the Comparative Example (using glass bubbles having a pressure resistance of less than 12,000 psi).

DETAILED DESCRIPTION OF INVENTION

Preparation of Liquid Crystal Polyester Resin

Preparation Example 1

12,000 g (117.5 moles) of acetic anhydride was added to a 200 L batch reactor and stirred. Then, monomeric para-hydroxybenzoic acid (HBA) 600 g (4.3 moles), 6,2-hydroxynaphthoic acid (HNA) 20,000 g (106.3 moles), biphenol (BP) 10,300 g (55.3 moles), and terephthalic acid (TPA) 9,200 g (55.4 moles) were added to the reactor, and then 12,000 g (117.5 moles) of acetic anhydride was additionally added to perform uniform mixing in the batch reactor. To this mixture, 3.1 g of a potassium acetate catalyst and 12.1 g of a magnesium acetate catalyst were added, and nitrogen was injected to maintain the internal space of the batch reactor inactive state. Thereafter, the temperature of the batch reactor was ramped over 1 hour to a temperature at which acetic anhydride was refluxed, and the hydroxyl groups of the monomers were acetylated at this temperature for 2 hours. While removing acetic acids produced in the acetylation reaction and unreacted acetic anhydrides added in excess, the reaction was heated to 320° C. at a rate of 0.5° C./min to obtain a liquid crystal polyester resin, which was discharged through a lower valve, cooled/solidified, and primary pulverized to prepare 36,000 g of a liquid crystal polyester resin. Then, secondary pulverization was performed using a fine-particulate grinder, and the mixture was placed in a rotary heater and the temperature was ramped to 200° C. for 2 hours while flowing nitrogen at a flow rate of 25 L/min. After holding at this temperature for 2 hours and ramping the temperature to 312° C. at a rate of 0.2° C./min, polycondensation was performed for 3 hours to obtain a liquid crystal polyester resin. The melting point of the obtained liquid crystal polyester resin 1 was 350° C.

Preparation Example 2

13,000 g (127.3 moles) of acetic anhydride was added to a 200 L batch reactor. While stirring the mixture, monomeric parahydroxybenzoic acid (HBA) 20,000 g (144.8 moles), biphenol (BP) 9,000 g (48.3 moles), terephthalic acid (TPA) 6,000 g (36.2 moles), and isophthalic acid (IPA) 2,000 g (12.1 moles) were added to the reactor, and then 14,100 g (138.1 moles) of acetic anhydride was additionally added to perform uniform mixing in the batch reactor. To this mixture, 2.8 g of a potassium acetate catalyst and 11.2 g of a magnesium acetate catalyst were added, and nitrogen was injected to maintain the internal space of the batch reactor inactive state. Thereafter, the temperature of the batch reactor was ramped over 1 hour to a temperature at which acetic anhydride inside the reactor was refluxed, and the hydroxyl groups of the monomers were acetylated at this temperature for 2 hours. While removing acetic acids produced in the acetylation reaction and unreacted acetic anhydrides added in excess, the reaction was heated to 320° C. at a rate of 0.5° C./min to obtain a wholly aromatic liquid crystal polyester resin, which was discharged through a lower valve, cooled/solidified, and primary pulverized to prepare 36,000 g of a liquid crystal polyester resin. Then, secondary pulverization of the liquid crystal polyester resin was performed using a fine-particulate grinder, and the mixture was placed in a rotary heater and the temperature was ramped to 200° C. for 2 hours while flowing nitrogen at a flow rate of 25 L/min. After holding at this temperature for 2 hours and ramping the temperature to 285° C. at a rate of 0.2° C./min, polycondensation was performed for 3 hours to obtain a liquid crystal polyester resin. The melting point of the obtained liquid crystal polyester resin 2 was 350° C.

EXAMPLES

The glass bubbles used in the examples of the present disclosure were S60HS, IM-16K, and S60 manufactured by 3M. The pressure resistance of S60HS was 18,000 psi, the pressure resistance of IM-16K was 16,000 psi, and the pressure resistance of S60 was 10,000 psi.

The average particle size of S60HS and S60 is 60 μm or more, and that of IM-16K is 40 μm or less.

The inorganic filler used in the examples of the present disclosure was SM-325W mica manufactured by Seokyung CMT, and the density of SM-325W was 0.25 to 0.35 g/cc, and the particle size was 30 μm.

Other inorganic fillers may include glass fibers, asbestos fibers, silica fibers, silica, potassium titanate fibers, talc, mica, glass flakes, and wollastonite.

Example 1

A liquid crystal polyester resin composition was prepared through melt extrusion while adding 30 wt % of glass bubble S60HS/5 wt % of mica based on 100 wt % of the liquid crystal polyester resin prepared in Preparation Example 1.

Example 2

A liquid crystal polyester resin composition was prepared under the same conditions as in Example 1, except that 20 wt % of glass bubble S60HS/15 wt % of mica was used.

Example 3

A liquid crystal polyester resin composition was prepared under the same conditions as in Example 1, except that 10 wt % of glass bubble S60HS/25 wt % of mica was used.

Example 4

A liquid crystal polyester resin composition was prepared under the same conditions as in Example 1, except that 30 wt % of glass bubble S60HS/25 wt % of mica was used.

Example 5

A liquid crystal polyester resin composition was prepared under the same conditions as in Example 1, except that 10 wt % of glass bubble S60HS/5 wt % of mica was used.

Comparative Example 1

A liquid crystal polyester resin composition was prepared under the same conditions as in Example 1, except that the liquid crystal polyester resin prepared in Preparation Example 2 was used as a base.

Comparative Example 2

A liquid crystal polyester resin composition was prepared under the same conditions as in Example 1, except that only the glass bubble was changed to S60.

Comparative Example 3

A liquid crystal polyester resin composition was prepared under the same conditions as in Example 2, except that only the glass bubble was changed to IM-16K.

Comparative Example 4

A liquid crystal polyester resin composition was prepared under the same conditions as in Example 1, except that 5 wt % of glass bubble S60HS/30 wt % of mica was used.

Comparative Example 5

A liquid crystal polyester resin composition was prepared under the same conditions as in Example 1, except that 35 wt % of glass bubble S60HS was used.

In the following Table 1, the components of the liquid crystal polyester resin composition of each Example and Comparative Example were summarized.

TABLE 1

|  | Ex 1 | Ex 2 | Ex 3 | Ex 4 | Ex 5 | C. Ex 1 | C. Ex 2 | C. Ex 3 | C. Ex 4 | C. Ex 5 |
| --- | --- | --- | --- | --- | --- | --- | --- | --- | --- | --- |
| LCP Resin 1 | 65 | 65 | 65 | 45 | 75 |  | 65 | 65 | 65 | 65 |
| LCP Resin 2 |  |  |  |  |  | 65 |  |  |  |  |
| S60HS | 30 | 20 | 10 | 30 | 10 | 30 |  |  | 5 | 35 |
| IM16K |  |  |  |  |  |  |  | 20 |  |  |
| S60 |  |  |  |  |  |  | 30 |  |  |  |
| Mica | 5 | 15 | 25 | 25 | 5 | 5 | 5 | 15 | 30 | 0 |

(Unit: wt %)

Test Examples

Measurement of Dielectric Constant and Dielectric Loss

After injection of the resin composition prepared in the above examples and comparative examples into a 0.5 mmt/60 mm×60 mm flat plate specimen, dielectric properties were evaluated by connecting 2.5 GHz Split Post Dielectric Resonator of Keysight Technologies Co., Ltd. to ENA Series Network Analyzer that can measure from 100 kHz to 8.5 GHz of Keysight Technologies Co., Ltd.

(Measurement Under a Microscope)

After sintering at 650° C., the inorganic additive was observed at a magnification of ×600 using an optical microscope (HIROX, XY-GB2).

FIG. 1 shows a microscopic observation of an inorganic additive remaining after sintering a liquid crystal polyester resin composition melt-extruded using a glass bubble having a pressure resistance of 12,000 psi or more at 600° C.

FIG. 2 shows a microscopic observation of an inorganic additive remaining after sintering a liquid crystal polyester resin composition melt-extruded using a glass bubble having a pressure resistance of less than 12,000 psi at 600° C.

From FIGS. 1 and 2, it can be seen that the hollow state of the glass bubbles having a pressure resistance of 12,000 psi or more is maintained. This indicates that the glass bubbles with high-pressure resistance play a role of a hollow body after melt extrusion, thereby properly achieving the functions of low dielectric constant and low dielectric loss.

(Measurement of Viscosity)

The melt viscosity of the resin composition obtained in each Example and Comparative Example was measured using a Capillary Rheometer (GOTTFERT RG20).

(Measurement of Bar Flow)

The resin obtained in each Example and Comparative Example was injected using a 0.2 mmt Bar Flow mold while changing the injection speed, and then the length of the injected specimen was measured to check the fluidity.

The melting temperature, melt viscosity, and dielectric constant of the liquid crystal polyester resin obtained in Preparation Examples 1 and 2 were identical, but in the case of dielectric loss, the liquid crystal polyester resin 1 was 0.002, and the liquid crystal polyester resin 2 was 0.004. As a result, the liquid crystal polyester resin in which the naphthoic acid monomer is a main skeleton exhibited a lower dielectric loss. It was confirmed that this was due to the property of having a lower functional group compared to the content while forming its own hollow in the molecular structure of the main skeleton of the naphthoic acid monomer.

TABLE 2

|  | Preparation Example 1 | Preparation Example 2 |
|---|---|---|
| Melting temperature (° C.) | 350 | 350 |
| Dielectric constant (Dk) | 3.48 | 3.48 |
| Dielectric loss (Df) | 0.002 | 0.004 |
| Melt viscosity (Pa · s) | 42.7 | 42.0 |

(Physical Properties of Liquid Crystal Polyester Resin Composition)

Example 1 and Comparative Example 1 were melt-extruded in the same amount of the same filler except for the liquid crystal polyester resin. At this time, the dielectric constant of the obtained liquid crystal polyester resin composition was identical, but the dielectric loss was lower in the composition of Preparation Example 1 using the liquid crystal polyester resin 1 in which the naphthoic acid monomer is a main skeleton, and the melt viscosity was also low and thus the fluidity was also excellent.

(Regarding a Filler Containing Composition)

The dielectric properties of the liquid crystal polyester resin composition using glass bubbles having different pressure resistance were confirmed. The dielectric properties of Example 1 to which S60HS having a pressure resistance of 12,000 psi or more was added and Comparative Example 2 to which S60 of less than 12,000 psi was added were compared. It was confirmed that the dielectric constant and dielectric loss of the composition of Example 1 in which glass bubbles having a strong pressure resistance were added were low. This is determined by the degree of breakage of the hollow shape of the glass bubbles due to shear stress generated between the screw and the barrel inside the extruder during melt extrusion. The use of glass bubbles with high pressure resistance has a low dielectric constant and dielectric loss since the hollow shape is less likely to be damaged. After sintering at 600° C., the maintenance of the hollow shape of the glass bubbles can be clearly confirmed by observing the inorganic filler under a microscope, and the dielectric properties were also determined according to the degree of maintaining the hollow shape of the glass bubbles.

As such, it is preferable that the pressure resistance of the glass bubbles is 12,000 psi. The higher the pressure resistance, the better. However, considering the inherent limitations of the material itself, cost, efficiency, etc., glass bubbles with a pressure resistance of up to 50,000 psi may be used.

The components of 5G communication related devices have a small and complex structure, so the fluidity should be secured, and the fluidity were confirmed using a glass bubble with a pressure resistance of 12,000 psi or more. When using S60HS and IM-16K with identical pressure resistance but different average particle sizes for the glass bubbles, the dielectric constant and dielectric loss are identical, but the melt viscosity and the fluidity confirmed through bar flow evaluation were found to be significantly different. The fluidity of the liquid crystal polyester resin composition using S60HS having a large average particle size were excellent. It was confirmed that the smaller the average particle size of the glass bubbles, the larger the surface area, which increases a resistance to the flow of the liquid crystal polyester resin, thus obstructing the flow and lowering the fluidity. Therefore, when the particle size of the glass bubble is 40 μm or more, productivity can be secured during an injection molding.

The contents of the glass bubble and the inorganic filler for securing the low dielectric properties are preferably in the range of 15 to 55 wt % based on the total weight of the liquid crystal polyester resin composition. In particular, if the content of the glass bubble that determines the dielectric property is less than 5 wt %, the dielectric property cannot be satisfied with the dielectric constant of 3.0 or higher, and if the glass bubble content is 35 wt % or more, it is accumulated during injection in the melt extrusion process, making quantitative injection difficult. Therefore, there is a problem in that the dielectric properties cannot be obtained because the glass bubbles cannot be uniformly dispersed in the liquid crystal polyester resin. Therefore, the content of glass bubbles was found to be an optimal concentration in the range of 10 to 30 wt % under conditions of securing dielectric properties, melt extrusion processability, and uniform dispersion.

TABLE 3

| | Ex 1 | Ex 2 | Ex 3 | Ex 4 | Ex 5 | C. Ex 1 | C. Ex 2 | C. Ex 3 | C. Ex 4 |
|---|---|---|---|---|---|---|---|---|---|
| Dielectric constant (Dk) | 2.85 | 2.93 | 2.98 | 2.97 | 2.95 | 2.86 | 3.21 | 2.90 | 3.7 |
| Dielectric loss (Df) | 0.002 | 0.002 | 0.002 | 0.002 | 0.002 | 0.006 | 0.004 | 0.002 | 0.004 |
| Viscosity (Pa·s) | 121 | 106 | 85 | 142 | 78 | 162 | 141 | 384 | 53 |
| Bar Flow (mm) 50 mm/s | 8 | 9 | 10 | 8 | 9 | 8 | 8 | 4 | 10 |
| 100 mm/s | 17 | 18 | 19 | 13 | 18 | 15 | 16 | 9 | 17 |
| 200 mm/s | 36 | 38 | 45 | 34 | 48 | 29 | 43 | 16 | 40 |
| 300 mm/s | 51 | 53 | 54 | 49 | 54 | 46 | 49 | 22 | 50 |

It was confirmed that in the case of the liquid crystal polyester resin composition of Examples 1 to 5 having the dielectric constant (Dk) of less than 3.0 and the dielectric loss (Df) of 0.002 or less, the dielectric properties of the material used as a component for the ultra-high speed communication equipment can be secured.

The invention claimed is:

1. A liquid crystal polyester resin composition having a low dielectric constant and a low dielectric loss, which comprises a liquid crystal polyester resin containing a naphthoic acid as a main monomer and a hydroxybenzoic acid as an additional monomer, wherein the naphthoic acid is contained in the range of 40 to 55 moles based on 100 moles of the total monomer of the liquid crystal polyester resin;
an inorganic filler; and
a glass bubble having a pressure resistance of 12,000 psi or more.

2. The liquid crystal polyester resin composition of claim 1, wherein the inorganic filler is at least one selected from the group consisting of silica, titanium oxide, talc, and calcium carbonate.

3. The liquid crystal polyester resin composition of claim 1, wherein the glass bubble has a particle size of 40 to 500 μm.

4. The liquid crystal polyester resin composition of claim 2, wherein the total content of the inorganic filler and the glass bubble is 15 to 55 wt % based on the total weight of the liquid crystal polyester resin composition.

5. The liquid crystal polyester resin composition of claim 1, wherein the liquid crystal polyester resin composition has a dielectric constant (Dk) of less than 3.0.

6. The liquid crystal polyester resin composition of claim 1, wherein the liquid crystal polyester resin composition has a dielectric loss (Df) of less than 0.004.

* * * * *